INVENTOR.
ALBERT S. HOVANNESIAN, ANSEL J. GERE
+ CHARLES CICCIARELLA
BY
EZEKIEL WOLF, WOLF + GREENFIELD
THEIR ATTORNEYS.

3,089,139
PROXIMITY WARNING SYSTEM

Albert S. Hovannesian, Arlington, Ansel J. Gere, Westwood, and Charles Cicciarella, Wakefield, Mass., assignors to Diamond Antenna & Microwave Corporation, Wakefield, Mass.
Filed May 1, 1958, Ser. No. 732,367
10 Claims. (Cl. 343—112)

The present invention relates to a system utilizing a radio frequency to light frequency transducer for use as a controlled means in a moving vehicle and relates particularly to a means incorporating a radio frequency to light frequency transducer as an aid in the avoidance of aircraft to aircraft collision.

In designing a system in which a moving aircraft is provided with a visual representation of other approaching aircraft, it is of some advantage to limit the visual representations provided to the pilot to approaching objects within a radius of several miles and flying at an altitude differing by less than 800 feet from the altitude of the aircraft utilizing the system based on the manner in which the airways and air space are presently utilized. Aircraft beyond this range or outside these narrow limits of difference in altitude are not considered a collision hazard. Thus, not only is it important to provide information of aircraft within the prescribed range but also to exclude information of aircraft beyond this range for by excluding such information the pilot will not be unnecessarily distracted from other duties.

In the present invention a radio frequency to light frequency transducer of the type shown in copending application Serial No. 698,122, filed November 22, 1957, is utilized in a modified form. This transducer is a device for converting microwave energy into visible light. The transducer employs a microwave collector which separates incoming rays according to their direction of arrival without scanning, channeling all rays from a given direction into a precise location corresponding to that direction from which they were received. By suitable electronics a spot of light is produced on the corresponding location of a viewing screen. Various spots of light appear simultaneously on the screen, conveying instantaneously information about objects in the scene at which the transducer is directed.

Such a transducer "sees" either the microwave originated by a transmitter carried with the transmitter and reflected off the various objects in the scene, or it "sees" transmitters located on the various objects in the scene for the purpose of pinpointing these objects. In either case the transmitters may emit specially coded microwaves which allow the construction of extremely sensitive sensing devices, and which also serve to identify the transmitter as well.

In order to properly locate approaching aircraft, each aircraft utilizing the system would carry a transmitter which is linked to an altimeter so that it automatically transmits a signal coded to correspond to the altitude at which the aircraft is flying. Aircraft requiring the anticollision information carry a transducer utilizing the present invention in which the collector is designed to resolve incoming microwaves according to horizontal direction of arrival over a full 360°. It does not resolve the vertical direction, nor is its field of view limited in angle as in our previously mentioned copending application. This coded information of the received signals is utilized together with the information derived from an altimeter to determine the altitude of the transmitter source relative to the altitude of the aircraft carrying the transducer. The information so derived may be displayed, if it is within the area of collision hazard, on a screen against suitable coordinates of relative bearing and difference in altitude. The decoder can be designed in such a manner as to spread the presentation in elevation according to the strength of the received energy, thereby rendering valuable information with respect to the distance to the hazard.

It is obvious that this particular device is of substantial advantage in navigating in cloud and fog areas as well as at night or under conditions in which visibility is limited. The information displayed on the screen indicates the vertical elevation and azimuth of the approaching object relative to the aircraft using the transducer system.

These are other objects of the present invention will be more clearly understood when considered in conjunction with the accompanying drawings in which.

Figure 2:
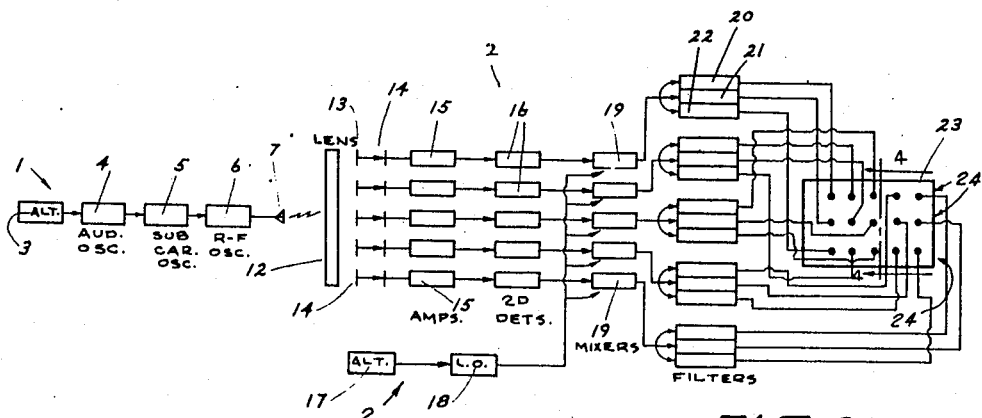
FIGURE 2 is a schematic block diagram of typical embodiment of the present system.
Figure 3:
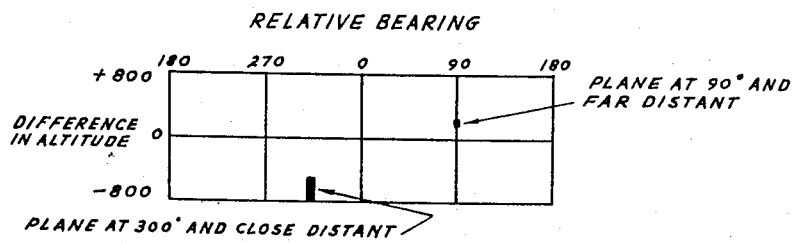
FIGURE 3 is a representation of the screen on which the information derived through the present system is displayed.

The present invention utilizes a cooperative system in which each aircraft which is to be detected by other aircraft using the system carries a transmitting unit indicated at 1 in FIG. 2. This is a microwave beacon transmitter emitting a signal having a first and second modulation. The first modulation is a code signal for the system itself while the second is a code system indicative of the height of the detected aircraft. The advantages of this double modulation system were fully explained in the copending application. The detecting aircraft carry a radio frequency to light frequency transducer capable of demodulating the signal from the intruding aircraft, that is, aircraft within a range determined to be a collision hazard range, in such a manner as to give the azimuthal direction as well as the relative height of this other aircraft. Such a system is generally indicated in FIG. 2 at 2.

Figure 1:
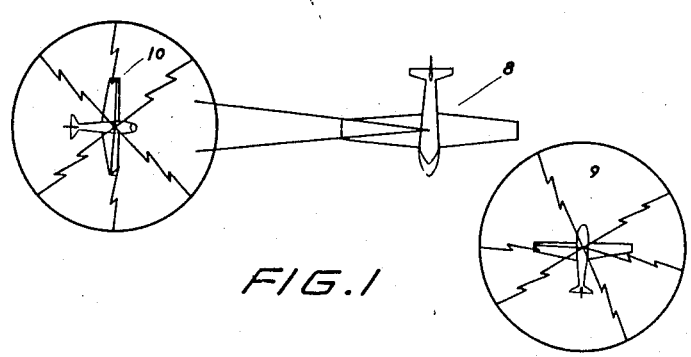
FIGURE 1 is a plan schematic representation of aircraft with typical radiation patterns used in the present system.

Referring first to the transmitting system, there is shown an aneroid element 3 which is made a part of this system and is separate from the aircraft's own altimeter. This aneroid element should be made without the usual adjustment for sea level pressure. This is important in obtaining a true relative height which might not otherwise prevail if an adjustable altimeter were used. This aneroid element 3 is electrically coupled to an audio oscillator 4, controlling the frequency of this oscillator to produce an audio frequency indicative of the plane's altitude. This audio frequency amplitude modulates a subcarrier frequency generated by the subcarrier oscillator 5. The frequency generated by the subcarrier oscillator 5 is an IF frequency precisely determined. This IF frequency of the subcarrier oscillator as amplitude modulated by the variable audio frequency is used to amplitude modulate the radio frequency carrier wave generated by the RF oscillator 6. The signal as thus obtained is fed to the transmitting antenna 7 which may be a simple vertical stub. Aircraft 9 and 10 preferably radiate energy equally in all horizontal directions but in vertical directions, the major portion of the signal is contained within a relative altitude of plus or minus 800 feet from the transmitting aircraft. The power utilized for transmitting this signal is selected so that signals are propagated over adequate distances, but not over distances so great that no immediate threat of collision will be indicated. A typical configuration is illustrated in FIG. 1 in which the detecting aircraft 8 if maintained on course will detect the aircraft 9 but not aircraft 10. It will be noted that the aircraft 8 will determine the received energy according to the horizontal sector from which it arrives.

The detecting apparatus which is mounted on the aircraft includes the system as generally indicated at 2. Here there is provided a radio frequency lens system particularly designed to receive and focus the microwave energy emitted by the antenna 7 along a focal line. This lens may be of the same type as disclosed in the foregoing application with the exception that it resolves the incoming microwaves according to horizontal direction of arrival and not vertical direction of arrival and may comprise, for example, an electromagnetic lens of a dielectric material such as polyethylene with the lens having a horizontal elliptical cross section and a uniform vertical cross section. After being focused by the lens 12 into the focal line 13, an array of sensing elements, preferably in the form of dipoles 14, receive the radio frequency energy at the particular location in which the individual dipoles are positioned in the focal line. Signals picked up by each dipole 14 are demodulated by detectors, preferably silicon diodes, and these demodulated signals, each being the modulated subcarrier, are fed to separate amplifiers 15. These amplifiers may be identical in construction and may be designed in a conventional manner. If desired, the amplifiers 15 may be gang controlled by a common operating means (not shown). The resultant detected signal is fed to a set of second detectors 16 with a detector 16 connected one each in series to each amplifier system 15. The signal is again detected in the second detector producing an output audio frequency signal which is indicative of the altitude of the aircraft which emitted this signal. An aneroid element 17, similar to the aneroid element 3 in the transmitting equipment is electrically connected to the local oscillator 18 and thereby controls the frequency of this oscillator which emits a frequency signal relative to and indicative of the altitude of the detecting aircraft. The signal from this local oscillator 18 is fed into a series of parallelly arranged frequency converters 19. A frequency converter 19 is provided in series with each of the second detectors 16. The signal from the local oscillator 18 is beat against the audio frequency signal detected by the detector 16 in these frequency converters 19. The resultant beat frequency is indicative of the difference of the altitudes of the detecting and detected aircraft. Connected to each frequency converter 19 in series are a plurality of tuned filters as illustrated schematically. Three tuned filters 20, 21 and 22 connected in parallel with one another are each connected in series with a frequency converter. The tuned filters are designed to pass different frequencies which correspond to different relative altitudes. Thus, filter 20 may be designed to pass a frequency which is indicative of relative altitudes of between 300 and 800 feet. Filter 21 may be designed to pass frequencies indicative of relative altitudes between −300 and +300 feet. Filter 22 may be designed to pass frequencies indicative of −300 to −800 feet relative altitude. The filters are each connected individually to different portions of the display screen 23. The filter connections in each group are connected to the screen 23 in vertical alignment as indicated at 24. The different groups of filters are arranged in horizontal alignment. Depending upon the filter through which the signal passes, a signal will be fed to one of the three contacts on the display screen in vertical alignment which are connected to the particular group of filters through which a signal is fed. The display screen 23 is of the same general type as disclosed in the foregoing copending application and is adapted to luminously display signals emitted at the contacts 24. While the foregoing discussion uses as an example three filters indicating altitudes as substantially above, same altitude or below, more filters can be incorporated indicating relative altitude with more precision.

Figure 4:
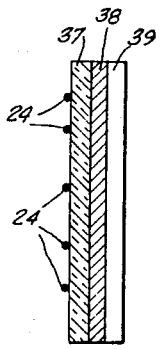
FIGURE 4 is a sectional view through section 4—4 of the display screen shown in FIG. 2.

Referring to FIG. 4, there is illustrated a sectional view through section 4—4 of the screen 23 shown in FIG. 2. A preferred form of this screen is the relatively newly developed electro-luminescent panels which can be excited to emit light at a plurality of individual points when respective electrodes thereat, such as electrodes 24, receive an energizing potential. These electro-luminescent panels may include luminescent particles such as phosphor particles suspended in plastic 37, a transparent or translucent conductive coating 38 and a layer of glass 39.

There are certain design limitations on the selection of the various frequencies employed in the present system which must be considered for optimal operation of the present invention. Particular care must be given in avoiding false signals resulting from the intermodulation product of two audio signals appearing in a single receiving channel. In analyzing the limitations, let $h_1$ be the height of the aircraft carrying the transmitter, and $h_0$ that of the aircraft carrying the receiver. Then the transmitted audio modulation frequency can be represented by the equation $$f_1 = A + Bh_1$$

and the local oscillator frequency accordingly by the equation $$f_0 = C + Dh_0$$

Here A, B, C and D are the numerical coefficients whose design limits we are analyzing. A and C are positive, and B and D can be either positive or negative. The restrictions on these numbers will now be investigated. The relative altitude signal can be chosen to be either the sum or the difference of the frequencies $f_0$ and $f_1$. In the former case it is $$f_s = A + C + Bh_1 + Dh_0$$

In order to obtain an unambiguous signal indicative of relative altitude it is necessary that $$B = -D$$

and $$A + C > |B| \, h \text{ max.}$$

where $h$ max. is the maximum altitude at which any craft will fly. With these restrictions we have $$fa_s = A + C + B(h_1 - h_0)$$

In the latter case when the relative altitude signal is taken as the difference frequency we have $$fa_D = A - C + Bh_0 - Dh_1$$

In order to obtain an unambiguous signal indicative of relative altitude it is again necessary that $$B = D$$

and $$(A - C) > |B| h \text{ max.}$$

with these resrtictions $$fa_D = A - C + B(h_1 - h_0)$$

Designating as $f_{l_1}$ the frequency produced by a craft at altitude $h_1$ and as $f_{l_2}$ the frequency produced by a craft at altitude $h_2$, the beat note which may be produced by the two signals appearing in the audio channel is either the sum or the difference of the two altitude signals, and is therefore represented by $$f_b = f_{l_1} \pm f_{l_2} = (A + Bh_1) \pm (A + Bh_2)$$

this beat note is therefore either $$f_b = 2A + B(h_1 + h_2)$$

or $$f_b = B(h_1 - h_2)$$

that is to say, the beat notes can occur throughout the bands $$0 \text{ to } |B| \, h \text{ max.}$$

and $$2A \text{ to } 2A + 2B \, h \text{ max.}$$

Any filter employed, therefore, must be tuned to frequencies between $|B|\ h$ max. and $2A$ otherwise it may give a false output.

When the sum frequency $f_{a_s}$ is employed in the design, the foregoing condition is satisfied when $C+Bh$ max. $<A$ and when the difference frequency $f_D$ is employed the condition is satisfied when $$|B|\ h\ \text{max.} - C < A$$

We will now use these criteria to pick a suitable set of frequencies. Others can be similarly determined.

First we will pick B.

$$\text{Let } B = \frac{4}{800}$$

for $h$ measured in feet. If $h$ max.$=64{,}000$ feet, we find $$|B|\ h\ \text{max.} = 320\ \text{cycles}$$

Using the difference frequency in our design we want $$|B|\ h\ \text{max.} - C < A$$

which will certainly be satisfied if $$C = |B|\ h\ \text{max.}$$

and $$(A-C) > |B|\ h\ \text{max.}$$

which will then be satisfied if $$A > 2|B|\ h\ \text{max.}$$

Let us take $$A = 1320$$
$$C = 320$$
$$B = \frac{4}{800}$$

then $$f_i = 1320 + \frac{4}{800} h_i$$

$$f_0 = 1000 + \frac{4}{800} h_0$$

We have therefore $$f_D = 1000 + \frac{4}{800}(h_i - h_0)$$

This expression represents a frequency of 1000 cycles when the altitudes are equal, and indicates that this relative altitude signal will change by $4/800$ of a cycle per foot. Three filters with pass bands centered on 997.3 cycles, 1000 cycles and 1002.7 cycles will separate the received signals into altitude bands centered on $\pm 550$ feet and 0 feet, as previously described.

The aneroid elements may be coupled to their respective oscillators in any convenient manner. For example, the rotating output of the aneroid barometer may be connected to a rotatable potentiometer arm with the terminals of the potentiometer in turn connected to the frequency conrol input of the oscillator.

If desired, the output of the system rather than being connected to a visual array as previously described may be connected to a controlled unit or computer for the automatic control of the vehicle in which it is installed, or alternatively for example, for the emission of signals to a remote station. Thus, this unit may be used particularly in connection with a computer for determining when the detected plane or missile is on a collision course.

Having now described our invention, we claim:

1. A cooperative system for aircraft to aircraft collision avoidance comprising means for emitting a radio frequency signal having a first and second modulating frequency signal and altimeter means operatively connected to said emitting means for controlling the frequency of said second modulating signal dependent upon the altimeter reading, adapted to be mounted in one aircraft, and separate means adapted to be mounted in another detecting aircraft, comprising a radio frequency lens system adapted to resolve incoming radio frequency signals in a horizontal direction along a focal line only, an array of radio frequency sensing elements arranged in said line, parallelly arranged demodulating and amplifying means for separately detecting and amplifying said second modulating signal in each sensing element, frequency converters coupled one each to each amplifying means, oscillator means and an altimeter means operatively controlling said oscillator means for emitting a signal dependent upon the altimeter reading in said second mentioned aircraft, said frequency converters each also connected to said oscillator means for emitting a beat signal related to the difference in altitudes of said aircraft, tuned filter means connected to each converter adapted to pass selected beat signals, and means for displaying said signals in a selected arrangement.

2. A cooperative system for aircraft to aircraft collision avoidance comprising means for emitting a radio frequency signal having a first and second modulating frequency signal and an absolute altimeter means operatively connected to said emitting means for controlling the frequency of said second modulating signal dependent upon the altimeter reading, adapted to be mounted in another detecting aircraft, comprising a radio frequency lens system adapted to resolve incoming radio frequency in a horizontal direction along a focal line only, an array of radio frequency sensing elements arranged in said line, parallelly arranged demodulating and amplifying means for separately detecting and amplifying said second modulating signal in each sensing element, frequency converters coupled one each to each amplifying means, oscillator means and an altimeter means operatively controlling said oscillator means for emitting a signal dependent upon the altimeter reading in said second mentioned aircraft, said frequency converters each also connected to said oscillator means for emitting a beat frequency signal related to the difference in altitudes of said aircraft, a tuned filter means connected to each converter adapted to pass selected beat signals, a luminescent display means, adapted when locally excited to emit a local luminescence, means connecting the outputs of said filter means in an array to local points on said display means in an arrangement corresponding to the array of said sensing elements with which each filter means is connected whereby excitation of one of said sensing elements may produce a corresponding local luminescent excitation on said display means.

3. A cooperative system for aircraft to aircraft collision avoidance comprising means for emitting a radio frequency signal modulated at a frequency indicative of the altitude of said emitting means, and separate means adapted to be mounted in a detecting aircraft comprising radio frequency detecting means having individual elements independently sensitive to said signals from different azimuthal originations for detecting and displaying said signals in a visual array corresponding with the azimuthal origination of said signals, and means sensitive to said modulated radio frequency signal for detecting and interpreting said modulating frequency.

4. A cooperative system for aircraft to aircraft collision avoidance comprising means for emitting a radio frequency signal modulated at a frequency indicative of the altitude of said emitting means, and separate means adapted to be mounted in a detecting aircraft comprising radio frequency detecting means having individual elements independently sensitive to said signals from different azimuthal originations for detecting and displaying said signals in a visual array corresponding with the azimuthal origination of said signals, means for determining the altitude of said detecting aircraft and deriving therefrom a second modulating frequency, and means for detecting and comparing said first mentioned modulating frequency with said second modulating frequency and deriving therefrom an indication of the difference in relative heights of said emitting means.

5. A device as set forth in claim 4 wherein said visual array is adapted to display relative heights and means are provided for applying said indication of the difference in relative heights to said visual array.

6. A cooperative system for aircraft to aircraft collision avoidance comprising means for emitting a radio frequency signal having a modulating frequency indicative of the altitude of said emitting means, and separate means adapted to be mounted in a detecting aircraft comprising radio frequency detecting means having individual elements independently sensitive to said signals from different azimuthal originations for detecting said modulating frequency and displaying the detected signals in a visual array corresponding with the azimuthal origination of said signals, and means for modifying said detected signals to visually display the height of said emitting means relative to said detecting aircraft comprising means for deriving a second modulating frequency indicative of the height of said detecting aircraft, means for combining said detected signals with said second modulating frequency signal to derive a difference frequency which is a measure of the difference in relative heights, and means operatively connecting said visual array to said last mentioned means whereby information as to said relative height is simultaneously displayed with said azimuthal origination.

7. A cooperative system for aircraft to aircraft collision avoidance comprising means for emitting a radio frequency signal modulated at a first frequency indicative of the altitude of said emitting means, and separate means adapted to be mounted in a detecting aircraft comprising radio frequency detecting means for focusing said signals in a focal line corresponding to and dependent on the azimuthal origination of said signals, a plurality of elements each arranged with a sensing element on said line and having a visual display element responsive to said signals in the sensing element connected thereto, said display elements correspondingly arranged to said sensing elements whereby visual indications of the azimuthal origination of said signals may be displayed and means sensitive to said component for detecting and interpreting said component.

8. A cooperative system for aircraft to aircraft collision avoidance comprising means for emitting a radio frequency signal having a component indicative of the altitude of said emitting means, and separate means adapted to be mounted in a detecting aircraft comprising radio frequency detecting means having individual elements independently sensitive to said signals from different azimuthal originations for detecting and displaying said signals in a visual array corresponding with the azimuthal origination of said signals, and means for modifying said signal in said visual array to visually display the height relative to said detecting aircraft of said emitting means comprising means for detecting said component, means for deriving a second component indicative of the height of said detecting aircraft, means for deriving a difference of said components which is a measure of the difference in relative heights, filter means connected to said means for deriving a difference comprising parallelly arranged band pass components adapted to selectively pass components of different magnitudes corresponding to different relative heights and means connecting each band pass component to different portions of said visual array whereby information as to the relative height of said emitting means is simultaneously displayed with said signals corresponding with azimuthal origination.

9. A cooperative system for aircraft to aircraft collision avoidance comprising means for emitting a radio frequency signal modulated at a first frequency indicative of the altitude of said emitting means, and separate means adapted to be mounted in a detecting aircraft comprising radio frequency detecting means for focusing said signals in a focal line corresponding to and dependent on the azimuthal origination of said signals, a plurality of elements each arranged with a sensing element on said line and having a visual display element responsive to said signals in the sensing element connected thereto, said display elements correspondingly arranged to said sensing elements whereby visual indications of the azimuthal origination of said signals may be displayed, means for modifying said visual indications for indicating the height relative to said detecting aircraft of said emitting means comprising means for detecting said first modulating frequency, means for deriving a second modulating frequency indicative of the height of said detecting aircraft, means for combining said first and second frequencies to derive a difference frequency as a measure of the difference of the relative heights, and means operatively connecting said last mentioned means to said visual display whereby said visual indications will be differently displayed dependent upon the magnitude of said difference frequency.

10. A device as set forth in claim 9 wherein said visual display elements comprise an illuminating panel adapted to emit localized areas of light arranged in pluralities of groups of areas, and in which each display element comprises one of said groups, and wherein said means operatively connecting said last mentioned means comprises parallel connections to each area in a group with each connection selectively sensitive to signals of different magnitude whereby an illuminating signal will be obtainable in a signal area of a group dependent upon the magnitude of the signal.

References Cited in the file of this patent

UNITED STATES PATENTS

| | | |
|---|---|---|
| 1,603,600 | Heising | Oct. 19, 1926 |
| 2,008,832 | Leonard | July 23, 1935 |
| 2,042,490 | Zahl | June 2, 1936 |
| 2,090,359 | Robinson | Aug. 17, 1937 |
| 2,480,123 | Deloraine et al. | Aug. 30, 1949 |
| 2,560,265 | Adler | July 10, 1951 |
| 2,568,568 | Stansbury | Sept. 18, 1951 |